(12) United States Patent
Van Fossen et al.

(10) Patent No.: US 11,143,325 B1
(45) Date of Patent: Oct. 12, 2021

(54) BIMETAL VALVE WITH INTEGRAL FUSE

(71) Applicant: Robertshaw Controls Company, Itasca, IL (US)

(72) Inventors: Matthew J. Van Fossen, Poplar Grove, IL (US); Douglas C. Lanz, South Elgin, IL (US)

(73) Assignee: Robertshaw Controls Company, Itasca, IL (US)

( * ) Notice: Subject to any disclaimer, the term of this patent is extended or adjusted under 35 U.S.C. 154(b) by 0 days.

(21) Appl. No.: 16/906,551

(22) Filed: Jun. 19, 2020

(51) Int. Cl.
| | | |
|---|---|---|
| *F16K 31/02* | (2006.01) | |
| *F16K 31/00* | (2006.01) | |
| *F15C 5/00* | (2006.01) | |
| *G05D 23/19* | (2006.01) | |
| *F16K 99/00* | (2006.01) | |

(52) U.S. Cl.
CPC .......... *F16K 31/025* (2013.01); *F16K 31/002* (2013.01); *F15C 5/00* (2013.01); *F16K 99/0001* (2013.01); *G05D 23/1921* (2013.01)

(58) Field of Classification Search
CPC .. F16K 31/025; F16K 31/002; F16K 99/0001; F15C 5/00; G05D 23/1921
USPC ... 137/468, 68.11, 68.12, 72, 315.37, 487.5; 251/68, 368, 11
See application file for complete search history.

(56) References Cited

U.S. PATENT DOCUMENTS

| | | | | |
|---|---|---|---|---|
| 3,229,956 A | * | 1/1966 | White | F16K 31/025 251/11 |
| 3,442,483 A | * | 5/1969 | Schwartz | G05D 23/1921 251/11 |
| 3,750,999 A | * | 8/1973 | Genbauffe | G05D 23/1921 251/11 |
| 3,826,605 A | * | 7/1974 | Hantack | F16K 31/025 431/66 |
| 3,862,820 A | * | 1/1975 | Hantack | F16K 31/025 431/66 |
| 4,053,136 A | * | 10/1977 | Perl | F23N 5/047 251/11 |
| 4,067,539 A | * | 1/1978 | Perl | F23N 5/045 251/11 |
| 4,142,553 A | * | 3/1979 | Sakakibara | F16K 31/025 137/625.44 |
| 4,412,650 A | * | 11/1983 | Young | F23N 5/045 236/101 E |
| 4,685,652 A | * | 8/1987 | Shopsky | F16K 31/002 137/550 |
| 4,955,583 A | * | 9/1990 | Shopsky | F16K 31/002 137/550 |
| 5,037,061 A | * | 8/1991 | Shopsky | F16K 31/025 251/11 |
| 5,318,268 A | * | 6/1994 | Cox | F16K 31/025 251/11 |

(Continued)

*Primary Examiner* — Minh Q Le
(74) *Attorney, Agent, or Firm* — Miller & Martin PLLC; Stephen J. Stark

(57) ABSTRACT

A bimetal valve has a valve seat movable intermediate a closed and open configuration relative to a port. An arm is connected to the valve seat having at least a bimetal portion. An electric heater selectively applies heat to the bimetal portion to transition the valve from closed to open, with many embodiments being biased in the closed configuration. A built-in fuse is provided in series with the heater between first and second electrical connections providing an electric supply to the electric heater.

20 Claims, 3 Drawing Sheets

(56) References Cited

U.S. PATENT DOCUMENTS

| | | | | |
|---|---|---|---|---|
| 5,353,828 A | * | 10/1994 | Troscinski | F16K 31/002 137/15.21 |
| 6,116,569 A | * | 9/2000 | Cox | F16K 31/002 251/11 |
| 2007/0169817 A1 | * | 7/2007 | Nigliazzo | F16K 31/025 137/198 |

* cited by examiner

BIMETAL VALVE WITH INTEGRAL FUSE

FIELD OF THE INVENTION

The present invention relates to valves, and more specifically, to valves having bimetal actuators often having an electrical current directed through a heater which causes a normally biased closed valve to open by heating a bimetal portion causing it to change shape.

BACKGROUND OF THE INVENTION

Bimetal valves have been around for at least forty years. U.S. Pat. No. 4,184,683 shows bimetal actuated valves utilized for temperature control in automotive passenger compartments of vehicles. Other uses are found in many industries such as gas burners utilized in residential and commercial cooking appliances, coffee makers, etc.

However, while the current valves operate satisfactory for their intended purposes, failures can occur. For instance, excessive current conditions could occur such as due to a failure of a hot surface ignitor (HSI) or other condition whereby a fiberglass wrap about the heater could melt and then become hardened while the valve is at least partially open. Then, the bimetal valve could remain in an open position allowing gas to flow into the burner (even though the valve should be biased into the closed position under such circumstances). Other over current failure modes have also been predicted and/or discovered by the applicant.

Failing to close is a particularly undesirable situation as one of ordinary skill could quickly understand. When gas valves are thought to be shut or closed, but are actually failed in the open position, a flow of gas may occur when it is not desired. Such a situation could potentially be dangerous.

Accordingly, there is believed to be a need for an improved, and/or safer, bimetal actuated valve construction for at least some applications.

SUMMARY OF THE INVENTION

Accordingly, it is an object of many embodiments of the present invention to provide an improved bimetal based valve construction in the marketplace.

It is another object of many embodiments of the present invention to provide an improved cantilevered arm having a bimetal component activated with a heater having an integral fuse.

It is another object of many embodiments of the present invention to provide an improved bimetal valve having built-in fuse protection.

It is another object of many embodiments of the present invention to provide an improved bimetal based, or memory shaped alloy based actuator movable between an open and closed position with selective application of resistance heat, the heater having an integral fuse.

Accordingly, a bimetal valve or a valve having a bimetal actuator is provided, preferably having a cantilevered arm with a valve seat which cooperates with a port to provide a closed configuration with the valve seat contacting the port in sealing engagement. In an open configuration, the valve seat is at least partially displaced relative to the port. In many embodiments the valve seat is normally biased into the closed configuration. Towards a secured end of the arm and/or along a portion of the arm, normally extends a heater such as a resistance heater, often wrapped in fiberglass or other coating or insulation, so as to selectively direct heat to the arm or at least some of a bimetal portion of the arm so as to cause the arm to change shape to direct the valve seat from the port and place the valve in an open configuration, normally with a desired amount of current passing through the heater.

In many embodiments, electrical connections for the heater pass through a base supporting the arm or proximate thereto. Intermediate one of the first or second terminals of a presently preferred embodiments is preferably a built-in fuse such as a fusible link which connects intermediate the terminals to the heater such as from the anode or cathode to the heater so that if the current exceeds a predetermined amount for a predetermined time, the fusible link is designed to fail (or separate) into an electrical open position before the heater overheats to potentially melt the fiberglass or other coating about the heater (or create other modes of failure) which could otherwise cause the valve actuator to fail in the open configuration. Allowing the valve to fail safe with an electrical open with the valve in the shut configuration overcomes potential disadvantages of prior art construction.

In testing, the applicant discovered that a Nichrome leg or link connection being about a 0.015 inch thickness to the cathode at one end and to a conductor connected to the heater element at the other failed under a load (i.e. separates along its length) of three volts at approximately 6.5 amps to thus open the electrical circuit thereby removing electrical power from the heater element to thereby allow the bimetal portion to go back to the shut configuration and prevent the actuator from failing in an open configuration. Without this integral fuse, when the heater was subjected to 8.5 amps at three volts, the valve seat remained open even after the heater element was de-energized. This failure occurred without the fiberglass wrap appearing to change state or appearance (which certainly could occur with other embodiments). Other embodiments could melt the insulation and have it resolidify to have other valves fail in the open configuration permitting gas to flow when believed to be shut. Still other modes of failure would be experienced without the built-in fuse.

By providing an integral, or built-in, fuse, a need for an external fuse would not be necessarily required (although could be utilized with various embodiments) and the proposed solution would not significantly add cost to existing valve constructions.

BRIEF DESCRIPTION OF THE DRAWINGS

The accompanying drawings illustrate the preferred embodiments of the invention and, together with the description, serve to explain the invention. These drawings are offered by way of illustration and not by way of limitation.

DETAILED DESCRIPTION OF THE PREFERRED EMBODIMENT

Figure 1:
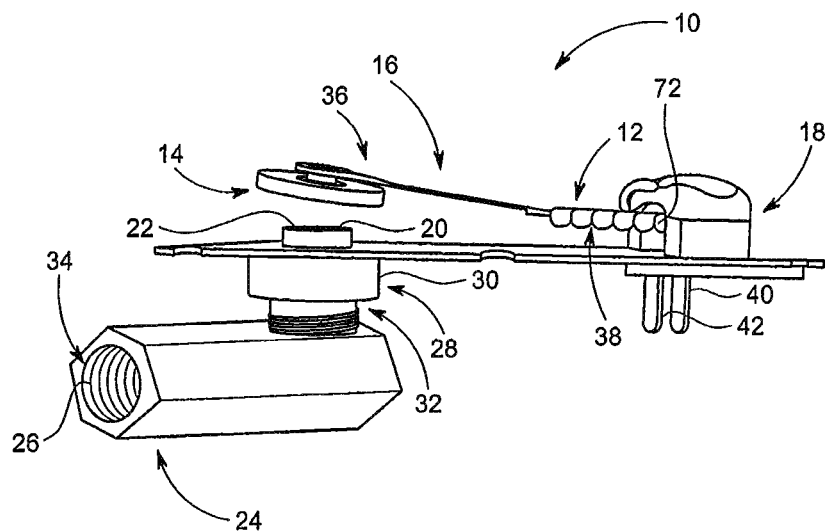
FIG. 1 is a left side perspective view of a presently preferred embodiment of the present invention in an operational mode and in an open configuration.
Figure 2:
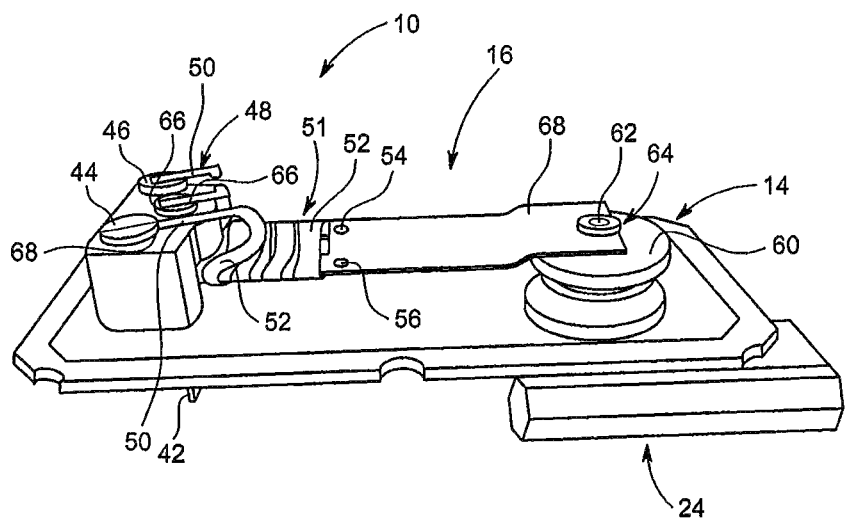
FIG. 2 is a right side perspective view of the presently preferred embodiment of the present invention in an operational mode and a closed configuration.
Figure 3:
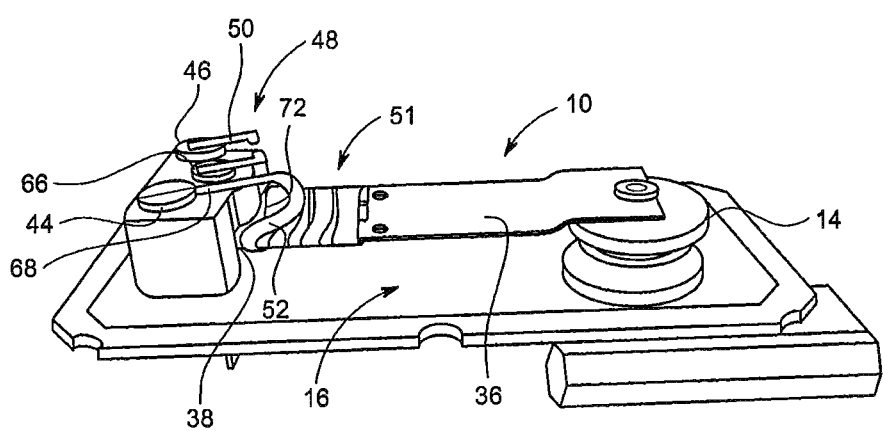
FIG. 3 shows the right side perspective view of FIG. 2 in a failed safe mode in a closed configuration.

FIGS. 1-6 show the presently preferred embodiment of the present invention. Specifically, a valve 10 of the presently preferred embodiment of the present invention has an actuator 12 connected to a valve seat 14 in the form of an arm 16 connected to a base 18. The valve 10 is shown in an open configuration in an operational mode with the valve seat 14 at least partially displaced relative to port 20 which preferably has a cooperating surface 22 such as an upper rim that contacts the valve seat 14 to provide a closed configuration whereby fluid is prevented from passing through the port 20 in the closed configuration as is shown in FIGS. 2-5 in the operational passing mode. Other valve seats 14 may close with ports 20 (of various designs) in various ways as known in the art.

Fluid connection 24 could have internal and/or external threads 26 which could connect to the fluid user, such as through piping, etc. The fluid connection 24, if utilized, may be an outlet for the illustrated embodiment, but could be an inlet for other embodiments receiving fluid from a supply (not shown) but is shown connected to the port 20 with fitting 28 as would be understood by those of ordinary skill in the art. Fitting 28 may have a shoulder 30 which could connect to a mount 32 and be oppositely disposed relative to the mount 32 from the port 20. Mount 32 may be threadedly or otherwise connected to fluid connection 24. The port 20 could be in fluid communication with the bore 34 of the fluid connection 24 so as to provide fluid through the port 20 in an open configuration such as is shown in FIG. 1 or otherwise in an operational mode.

The arm 16 may be comprised of an extension 36 connected to a bimetallic portion 38. The bimetal portion is shown connected to the base 18. In order to actuate (i.e., move) the actuator 12, first and second terminals 40,42, preferably one of which being positive and the other be ground or negative, complete an electric circuit to direct current up to anode 44 and cathode 46. Built-in fuse 48 in the form of a fusible link or necked portion 50 for at least some embodiments is shown connected to a heater 51 which is illustrated in the form of an electrical resistance heater possibly having an insulator 52 which is illustrated to be a fiberglass sheath. Other insulators and/or designs of heaters 51 could be utilized for various other embodiments. The heater 51 is shown about (or at least proximate to) at least a portion of the bimetal portion which is shown being tack welded with connections 54,56 to extension 38. Other connections could be utilized with other embodiments. Valve seat 14 is shown as being a disc 60 which could be resilient disc possibly connected with a button 62 or otherwise held in a groove 64 or other portion of the extension 36 or otherwise. Various connectors can be utilized to connect the valve seat 14 to the arm 16 for various embodiments.

FIG. 2-5 show the valve 10 in a closed configuration. The first and second terminals 40,42 are illustrated oppositely disposed about the mount 32 from the base 18 for at least some embodiments. Base 18 is shown extending above the mount 32, The arm 16 may be (or not) perpendicular the base 18 for at least some embodiments in the closed configuration and possibly parallel to the mount 32 for some embodiments.

The arm 16 is preferably biased so as to direct the valve seat 14 into the closed configuration for many embodiments. Upon directing a predetermined current and voltage to the terminals 40,42 such as three volts at approximately 3 amps the bimetal portion 38 changes shape so as to lift the valve seat 14 from the port 20 in the operational mode shown in FIG. 1 to an open configuration. Upon securing the voltage, the bimetal portion 38 returns the valve 10 to its closed configuration once the heater 51 is secured. The valve seat 14 is in contact with the port 20 that provide a sealing condition in the closed configuration. When in the open configuration the valve seat 14 at least partially displaced relative to the port 20.

Accordingly, one of ordinary skill in the art will see a current running between first and second terminals 40,42 passes through the heater 51 as long as the built-in fuse or fuse 48 is its operational mode. The fuse 48 has for many embodiments has a necked portion 53 calculated to separate to provide an electrical open at gap 55 so as to stop the flow of current through the heater 51 and thus stop heating the bimetal portion 38 when the current through the built-in fuse 48 it exceeds a predetermined amount and/or electrical conditions exceed a predetermined setting for a predetermined amount of time in a failed safe mode.

Fuses 48 can be rated based on a specific expected voltage in current (IEO) and/or other factors as are known by those of ordinary skill in the art. In one embodiment of the applicant's construction, a Nichrome leg of a necked portion 53 of a fuse 48 of about 0.015 inch thickness connected between the cathode 46 and a conductor 66 conducted one end of the heater 51. The other end of heater 51 may be connected to anode 44. Under a three volt load the necked portion 53 was found to open with gap 55 at about 6½ amps which was less than the approximate 8½ amps which had caused the bimetallic portion 38 to lose some of its resiliency and remain open (without the fiberglass changing state or appearance). Trial and error and/or engineering may be applied to the fuse 48 which may have a portion with an appropriate cross-section construction to address a predetermined electrical condition and/or safety rating.

If current exceeds a predetermined value that appears for a predetermined time (potentially at an expected or exceeded voltage), the fuse 48 may function as designed. A jump in voltage would likely create a corresponding jump in current which could also be problematic and be addressed by the fuse 48. The first and second terminals 40,42 selectively receive an electrical voltage from electrical source in communication with the heater 51 when installed.

When the fuse 48 fails (intentionally, i.e. provides an electrical open or gap 55) intermediate the first and second terminals 40,42, the current has likely exceeded a predetermined value for a predetermined time. The fuse 48 provides an electrical opening or gap 55 between the first and second terminals 40,42 preventing further heat application from the heater 51 to the bimetal portion 38 of the arm 16 in the failed safe mode while the valve seat 14 closes with the port 20.

As illustrated in FIG. 1 the arm 16 is shown cantileveredly connected to the base 18. The base 18 is connected to the mount 32. The arm 16 can extend parallel to the mount 32 in some embodiments in a closed configuration.

The first and second terminals 40,42 can extend opposite the mount 32 relative to the base 18 for at least some embodiments. The anode 44 and cathode 46 can be in an electrical communication respectively with the first and second terminals 40,42 for at least some embodiments. The cathode 46 is shown connected to heater 51 by leg 68. The conductor 66 is in electrical communication with leg 68 through the heater 51. The conductor 66 may connect to a terminal end (first or second) of the heater 51 such as to a first end 70 of the heater 51. The second end 52 of heater 51 may connect to the cathode 46 in the base 18 or otherwise.

Figure 4:
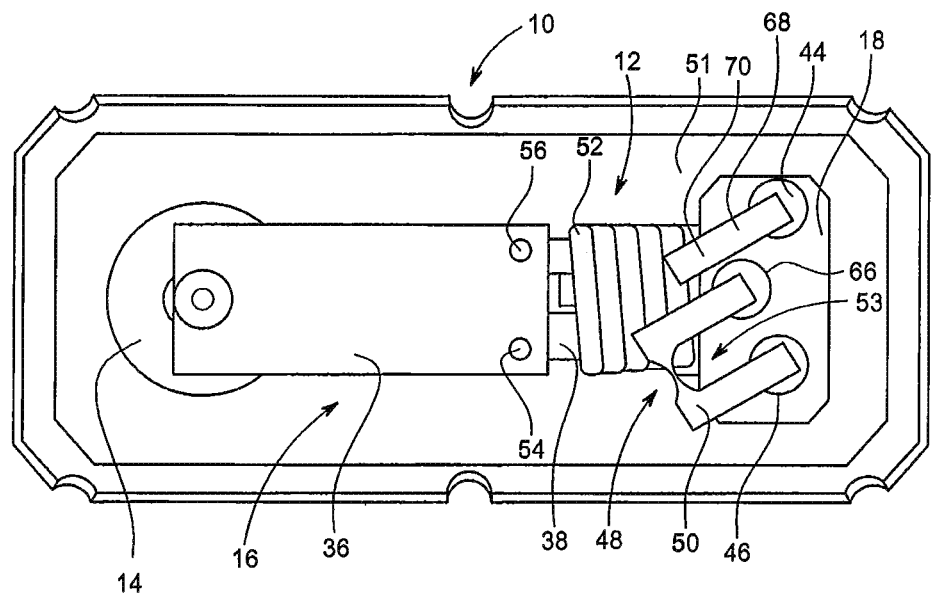
FIG. 4 shows a top plan view of the presently preferred embodiment in an operational mode and in a closed configuration.
Figure 5:
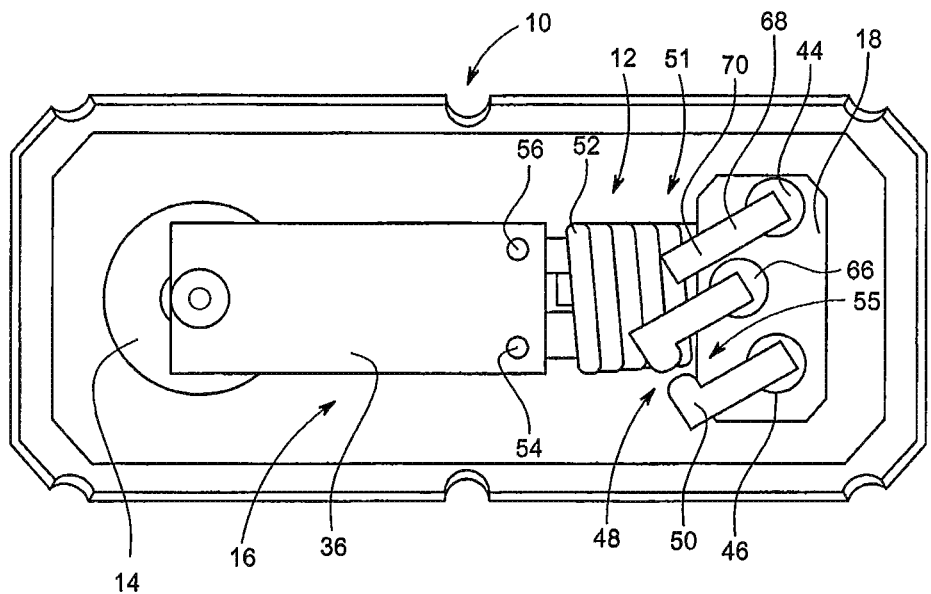
FIG. 5 shows a top plan view of the embodiment of FIG. 4 with the integral fuse in a failed safe mode and in a closed configuration.

Other constructions could be provided with other embodiments. FIGS. 1 and 4 show the fuse 48 is in an operational mode.

When the current is excessive, the fuse 48 preferably acts as it is designed to perform. Separation or gap 55 can occur between the first and second terminals 40,42 if not the anode 44 and the cathode 46 so that an electrical open occurs, thereby preventing the flow of current through the heater 51. The valve seat 14 is still biased in the shut or closed configuration against the port 20 so that the valve does not fail (with the valve being fluidly open) due to an overcurrent condition (where it could otherwise fail to close when it is designed to be in a closed configuration).

When a necked region 53 and/or fusible link 50 is utilized as the fuse 48, fuses 48 could extend from the anode 44 or cathode 46 above or at a top of the base 18 so that the fuse 48 could be connected at an upper surface of the anode 44 or cathode 46 and then extend to connect to second end 52 of a heater 51 such as a resistance heater. The second end 52 of the heater 51 may connect at conductor 66 or otherwise internal to the base 18 in the illustrated embodiments or otherwise. Other embodiments could connect with other constructions.

Numerous alterations to the structures herein disclosed will suggest themselves to those skilled in the art. However, it is to be understood that the present disclosure relates to the preferred embodiment of the invention for which is for purposes of illustration only and not to be construed as a limitation of the invention. All such modifications which do not depart from the spirit of the invention are intended to be included within the scope of the appending claims.

What is claimed is:

1. A valve comprising:
   a valve seat connected to an arm;
   a port, said valve seat moved by the arm intermediate a closed configuration and an open configuration, wherein when in said closed configuration, the valve seat contacts the port preventing fluid flow through the port, and when in the open configuration, the valve seat is at least partially displaced from the port thereby permitting the flow of fluid through the port;
   the arm having at least a bimetal portion;
   a heater selectively applying heat to the bimetal portion;
   first and second terminals selectively receiving an electrical voltage from an electrical source in communication with the heater when installed; and
   a built-in fuse intermediate the first and second terminals, in series with the heater, whereby if current exceeds a predetermined value for a predetermined time, built-in the fuse creates an electrical open between the first and second terminals preventing further heat application from the heater.

2. The valve of claim 1 wherein the built-in fuse is a fusible link.

3. The valve of claim 2 wherein the fusible link is a Nichrome member having a predetermined cross sectional area designed to separate at a predetermined electrical condition maintained for a predetermined time.

4. The valve of claim 1 wherein the arm is cantileveredly mounted to extend from a base, said base spaced apart from the port.

5. The valve of claim 4 wherein the base is connected to a mount.

6. The valve of claim 5 wherein the arm extends parallel to the mount.

7. The valve of claim 4 wherein the first and second terminals extend oppositely relative to the base on the mount.

8. The valve of claim 4 wherein the first second terminals connect respectively to an anode and a cathode extending through the base.

9. The valve of claim 8 wherein the built-in fuse connects to one of the anode and the cathode at a first end and the heater at a second end.

10. The valve of claim 8 wherein the fuse is a fusible link.

11. The valve of claim 10 wherein the fusible link is a Nichrome member having a predetermined cross sectional area designed to separate at a predetermined electrical condition maintained for a predetermined time.

12. The valve of claim 4 wherein the arm extends perpendicularly from the base.

13. The valve of claim 5 further comprising a gas connection connected to a gas supply, said gas connection in communication with the port.

14. The valve of claim 13 wherein the gas connection is oppositely disposed form the port relative to the mount.

15. The valve of claim 4 wherein the bimetal portion of the arm connects to the base.

16. The valve of claim 15 wherein the bimetal portion of the arm connects to an extension, said the extension connects to the valve seat.

17. The valve of claim 1 wherein the heater is an electrical resistance heater.

18. The valve of claim 17 where in the electrical resistance heater has an insulator thereabout.

19. The valve of claim 18 wherein the insulator is a fiberglass sheath, and the electrical resistance heater is wrapped about the bimetal portion.

20. The valve of claim 1 wherein the valve seat is normally biased in the closed configuration.

* * * * *